Oct. 2, 1923.

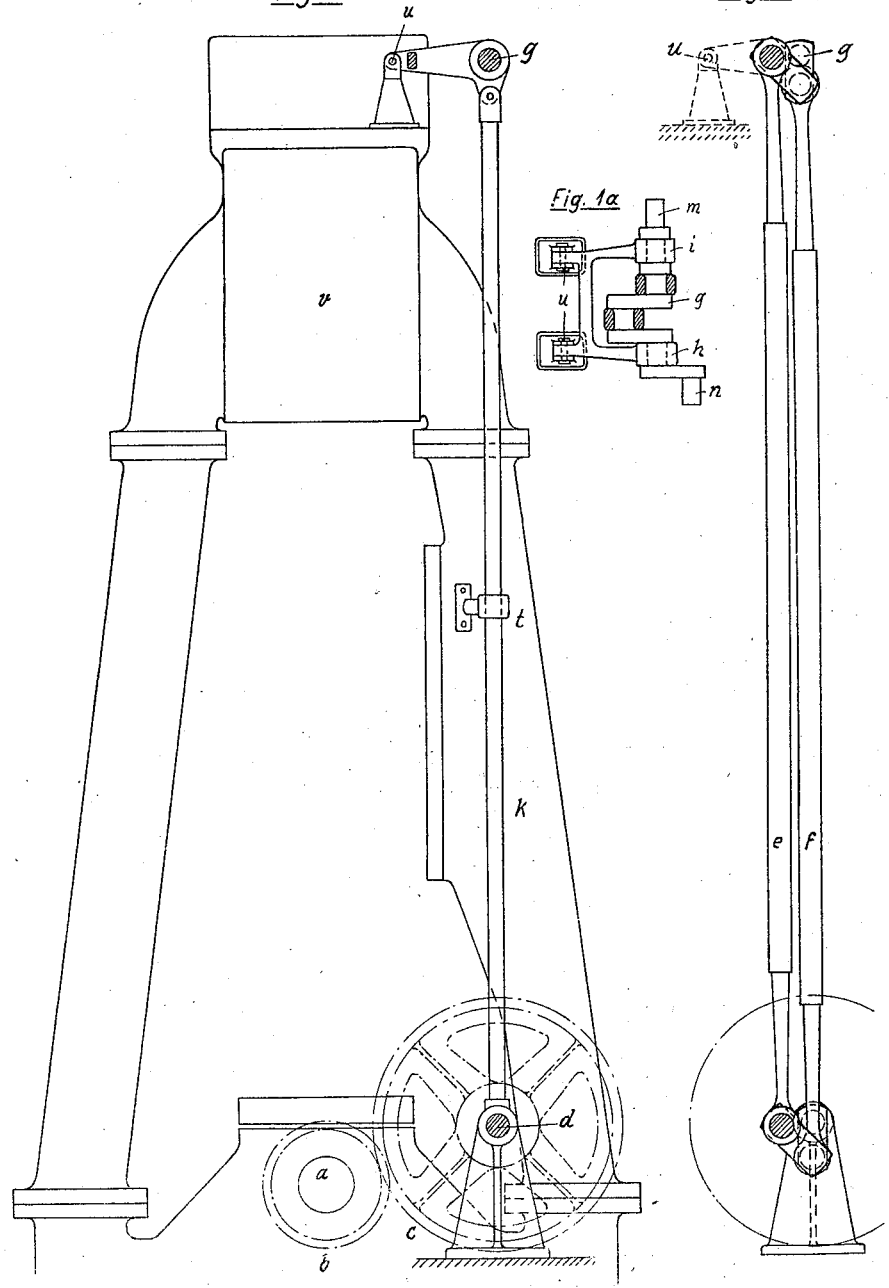

V. REMBOLD 1,469,443

ENGINE REVERSING SHAFT IN EXPLOSION MOTORS

Filed Aug. 31, 1921   2 Sheets-Sheet 2

WITNESSES:

INVENTOR:-
Victor Rembold

Patented Oct. 2, 1923.

1,469,443

UNITED STATES PATENT OFFICE.

VICTOR REMBOLD, OF KIEL, GERMANY.

ENGINE-REVERSING SHAFT IN EXPLOSION MOTORS.

Application filed August 31, 1921. Serial No. 497,448.

*To all whom it may concern:*

Be it known that I, VICTOR REMBOLD, a citizen of Germany, residing at Kiel, in the German Republic, have invented new and useful Improvements relating to Engine-Reversing Shafts in Explosion Motors (for which I have filed application in Germany, 49,928, April 8, 1920), of which the following is a specification.

This invention relates to engine-reversing shafts in explosion motors and more especially for use on ships, said shaft being ordinarily controlled by and connected with the main engine-shaft through the intervention of coupling rods. This arrangement has the advantage that intermediate parts such as worm gear, or bevel-wheels, are not required and which on being out of order cannot be easily repaired on board ship and can only with difficulty be replaced by a substitute in foreign ports.

My invention, therefore, resides in that the engine-reversing shaft is driven with but two coupling rods from the main engine-shaft in two-stroke motors, or from an intermediate shaft in four-stroke motors, notwithstanding any elongation of the engine standards through piston-knocks or temperature-changes in existing tall forms of ship's engine. For the purpose of compensating for the said elongation I arrange for that portion of the reversing shaft that includes the crank-pins connected with said coupling rods, to be so yieldingly mounted at the upper part of the motor as to be capable of swinging, or sliding with regard to the accoupled shaft-portions, while, furthermore, the bearings for the said shaft-portion are connected by means of rods with the bearings of the driving or power-transmitting shaft or with the bed plate of the motor. The other portion of the reversing shaft with the cranks, which is mounted direct on the upper part of the motor, is actuated by the swinging shaft-portion through the intervention of a variable-coupling-crank with attached slide-blocks.

Figure 4:
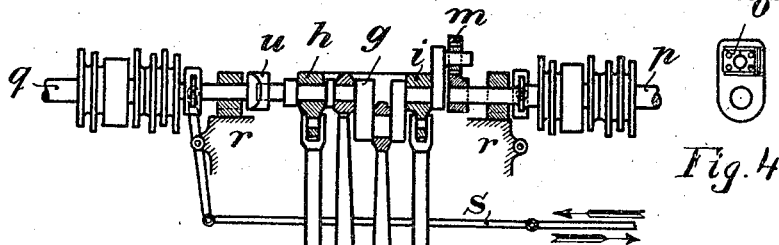
Figure 3:
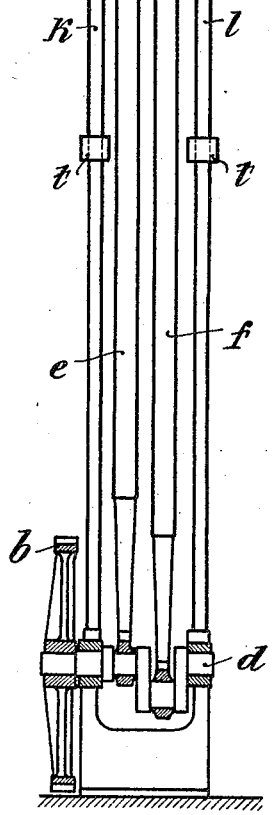

In the accompanying drawings, Figs. 1 to 4:

Figure 1 is a diagram, in side elevation, partly shown in section, of a portion of a ship's explosion motor fitted with the improved reversing gear; Fig. 1ᵃ is a plan of the middle portion of the movable shaft; Fig. 2 shows in side elevation a portion of the reversing gear; Fig. 3 is a front elevation of the reversing gear; Fig. 4 is a face view of one of the variable coupling cranks.

In these drawings, $a$ is the motor crankshaft driving by means of toothed wheels $b$ and $c$ an intermediate lay shaft $d$ which by its cranks imparts movement to the connecting rods $e$ and $f$ secured to the middle shaft portion $g$, which with the shaft portions $p$ and $q$ forms the reversing shaft. The shaft portion $g$ is carried in bearings $h$ and $i$ capable of swinging on pins $u$ around which these parts form a swinging frame supported by struts $k$ and $l$ rigidly seated on the bed of the motor. The reversing cranks $m$ and $n$, at opposite ends of the shaft portion $g$, are fitted with radially movable blocks $o$. The said reversing cranks drive alternately the reversible shafts $p$ and $q$ which carry the usual crank-arms and are mounted in the bearings $r$. The bearings $r$ are directly connected with the upper part of the motor. The shafts $p$, $q$ can be shifted by means of the rods $s$. For this purpose the crank-pins are sufficiently long to permit of such endwise shifting of the reversing shaft portions with their crank-arms without disengagement of the parts. The struts $k$ and $l$ can be protected against buckling by means of stays $t$.

By the aforesaid swinging or vertical displacement of the shaft portion $g$ the latter is capable of yielding to any appreciable elongation of the engine standards due to piston knocks or to temperature effects Under such circumstances the shaft-portion $g$ can move parallel from its axial position without affecting the shaft portions $p$ and $q$.

While I have herein shown and described a three-part reversing shaft, it must be understood that the employment of three parts for this shaft is not essential, since a two-part arrangement may as well be used.

The mode of operation of the engine reversing shaft according to my invention is as follows. The two parts $p$ and $q$ of the reversing shaft are rotated by the middle part $g$ of the shaft by means of pivots mounted within the blocks of the reversing cranks $m$ and $n$. If now an elongation of the engine frame takes place, the cylinder $v$ together with the parts $p$ and $q$, which are fixed thereon, will move upward according to the elongation of the frame. In this event the middle part $g$ of the reversing shaft will be made to yield by reason of its swinging bearings and in consequence to this, the distance between the two shafts $d$ and $g$ will always remain unchanged. If the middle or cranked part of the reversing shaft were rigidly coupled with the two other parts $p$ and $q$ a strong pull would be exerted upon the reversing gear and the shaft $d$ resulting in an excessive strain upon the shaft bearings. This disadvantage is avoided by my invention and the coupling rods $e$ and $f$ will never exert any injurious action in case of an elongation of the engine frame.

I claim:

1. In reversing gear for explosion motors, the combination with said motor and its main crank-shaft, of a lay-crank-shaft driven by the said main shaft, a plural part reversing shaft, the one part of same being a swinging cranked member, connecting rods coupling the latter with the said lay-crank-shaft, and yielding coupling means between the several parts of the reversing shaft.

2. In reversing gear for explosion motors, the combination of a motor, a main crank shaft, a lay-crank-shaft driven by said main shaft, a superposed plural part reversing shaft, one part of same being a swinging cranked-member, connecting rods coupling the latter with the said lay-crank-shaft, yielding coupling means between the several parts of the reversing shaft, and means for shifting the outer parts of the latter.

VICTOR REMBOLD.